United States Patent [19]

Takanashi et al.

[11] Patent Number: 4,977,417

[45] Date of Patent: Dec. 11, 1990

[54] ELECTROPHOTOGRAPHY SYSTEM

[75] Inventors: Itsuo Takanashi, Kamakura; Toshikatsu Ichitou, Kawasaki; Hiroki Kitamura, Tokyo; Takashi Yamamura, Yokohama; Koubun Sakagami; Atsushi Nakano, both of Sagamihara, all of Japan

[73] Assignee: Victor Company of Japan, Ltd., Japan

[21] Appl. No.: 450,772

[22] Filed: Dec. 14, 1989

[51] Int. Cl.[5] .................... G01D 15/14; G03G 15/01; G03G 21/00

[52] U.S. Cl. .................................. 346/160; 346/157; 355/202

[58] Field of Search ................ 346/160, 157; 355/202

[56] References Cited

U.S. PATENT DOCUMENTS 2,576,047 10/1948 Schaffert .

4,264,188 4/1981 Tomosada et al. ............ 355/309 X 4,294,534 10/1981 Snelling ......................... 355/241 X 4,330,195 5/1982 Lavallee ......................... 346/160 X 4,814,824 3/1989 Ito et al. ........................ 355/313 X

*Primary Examiner*—George H. Miller, Jr.

*Attorney, Agent, or Firm*—Lowe, Price, LeBlanc, Becker & Shur

[57] ABSTRACT

An electrophotography system for use in laser printers, printing machines and copying machines. The system includes a rototable drum having a photosensitive member which can take a first absorption spectrum state and a second absorption spectrum state, the variation from the first absorption spectrum state to the second absorption spectrum state being made by illuminating it with light whose intensity is above a predetermined threshold and whose wavelength is in a first predetermined wavelength region. Also included is an optical system including a light-emitting device for illumination of the photosensitive member so as to form thereon an electrostatic latent image, the optical system being arranged to directly illuminate the photosensitive member with light from the light-emitting device and further to illuminate it with reflected light from an original picture. The light-emitting device is arranged to emit light whose wavelength is in the first predetermined wavelength region and further light whose wavelength is in a second predetermined wavelength region. A control unit performs one selected from a laser-printing mode, a printing mode and a copying mode so as to form the corresponding electrostatic latent image on the photosensitive member by lights which are different in intensity and wavelength from each other.

9 Claims, 7 Drawing Sheets

ELECTROPHOTOGRAPHY SYSTEM

BACKGROUND OF THE INVENTION

The present invention relates generally to electrophotography systems, and is applicable particularly, but not exclusively, to electro-printing machines, laser beam printers and copying machines.

Electrophotography systems are currently used in fields of copying art such as electro-copying machines, where an electrostatic latent image is formed on a photosensitive device by projecting thereto an optical image of an original picture and then developed with a desirable toner for formation of a so-called hard copy. An important problem in such a copying technique relates to difficulty being encountered to meet requirements in terms of speed-up of copying, because exposure of the original optical image on the photosensitive device is indispensable to obtaining a copy. Thus, in view of the speed-up, an apparatus additionally having a printing function has been proposed as disclosed in U.S Pat. No. 2576047, where an electrostatic latent image is formed on a photosensitive device (made of zinc oxide) by an exposure of an optical image of an original picture and then toner-developed and fixed to obtain a printing plate whereby printing is effected through processes such as charging, exposure, transferring and fixing. There is a problem which arises with such prior art technique, however, in that the printing plate is required to be replaced with new one in switching from the printing mode to the copying mode, thereby resulting in being troublesome in operation. In addition, such prior art technique is not applicable to laser beam printers which are arrange so as to form an electrostatic latent image in accordance with an information signal corresponding to an image to be recorded. Japanese Patent Provisional Publication No. 59-15249 discloses a system having functions for application to both copying machines and laser beam printers. However, this system is not applicable to printing machines.

SUMMARY OF THE INVENTION

It is therefore an object of the present invention to provide an electrophotography system which is applicable to all printing machines, laser beam printers and printing machines.

In accordance with the present invention, there is provided an electrophotography system comprising: a rotatable drum arranged to be rotatable about its own axis in accordance with a drum-drive signal and having on its circumferential surface a photosensitive member for holding an electrostatic latent image, said photosensitive member being arranged to take a first absorption spectrum state and a second absorption spectrum state, and the variation from said first absorption spectrum state to said second absorption spectrum state being made by illuminating said photosensitive member with light whose intensity is above a predetermined threshold and whose wavelength is in a first predetermined wavelength region; an optical system including light source means for illumination of said photosensitive member so as to form an electrostatic latent image on said photosensitive member, said optical system being arranged to directly illuminate said photosensitive member by light from said light source means and further to illuminate said photosensitive member by reflected light from an original picture due to said light source means, said light source means being arranged to emit light whose wavelength is in said first predetermined wavelength region and further emit light whose wavelength is in a second predetermined wavelength region, the intensity of the light emitted from said light source means being controllable in intensity in accordance with an information signal; electrifier means for charging said photosensitive member in response to an electrifier-drive signal; and control means for generating said drum-drive signal, said information signal and said electrifier-drive signal to control the rotation of said rotatable drum, said optical system and said electrifier means so as to form an electrostatic latent image on said photosensitive member by selectively performing a laser-printing mode, a printing mode, a first copying mode and a second copying mode, said laser-printing mode being effected by evenly charging said photosensitive member, taking said first absorption spectrum state, by means of said electrifier means before illuminating said photosensitive member with light from said light source means whose intensity is below said predetermined threshold and whose wavelength is in said first predetermined wavelength region, said printing mode being effected by illuminating said photosensitive member, taking said first absorption spectrum state, with light from said light source means, whose intensity is above said predetermined threshold and whose wavelength is in said first predetermined wavelength region, so that said photosensitive member partially takes said second absorption spectrum state in correspondence with said information signal and evenly charging said photosensitive member by said electrifier means before illuminating the whole surface of said photosensitive member with light which has a wavelength in said second predetermined wavelength region, said first copying mode being effected by charging said photosensitive member, taking said first absorption spectrum state, by means of said electrifier means and then illuminating said photosensitive member with reflected light from the original picture which has an intensity below said predetermined threshold and which has a wavelength in said first predetermined wavelength region, and second copying mode being effected by illuminating said photosensitive member with light from said light source means, whose intensity is above said predetermined threshold and whose wavelength is in said first predetermined wavelength region, so that said photosensitive member wholly takes said second absorption spectrum state and then charging said photosensitive member by said electrifier means before illuminating said photosensitive member with reflected light from the original picture which has an wavelength in said second predetermined wavelength region.

Moreover, the electrophotography system can perform a second printing mode in which the photosensitive member, taking the first absorption spectrum state, is illuminated with light from the light source means, whose intensity is above the predetermined threshold and whose wavelength is in the first predetermined wavelength region, so that the photosensitive member partially takes the second absorption spectrum state in correspondence with the information signal and evenly charged by the electrifier means before illuminating the whole surface of the photosensitive member with light which has an wavelength in the first predetermined wavelength region. Preferably, the photosensitive member comprises a carrier generation layer made of a carrier generation material which allows production of a charge carrier in response to absorption of light and a carrier transport layer made of a carrier transport material which allows transport of the charge carrier produced in said carrier generation material, the carrier transport layer is mounted on the carrier generation layer to construct the photosensitive member.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
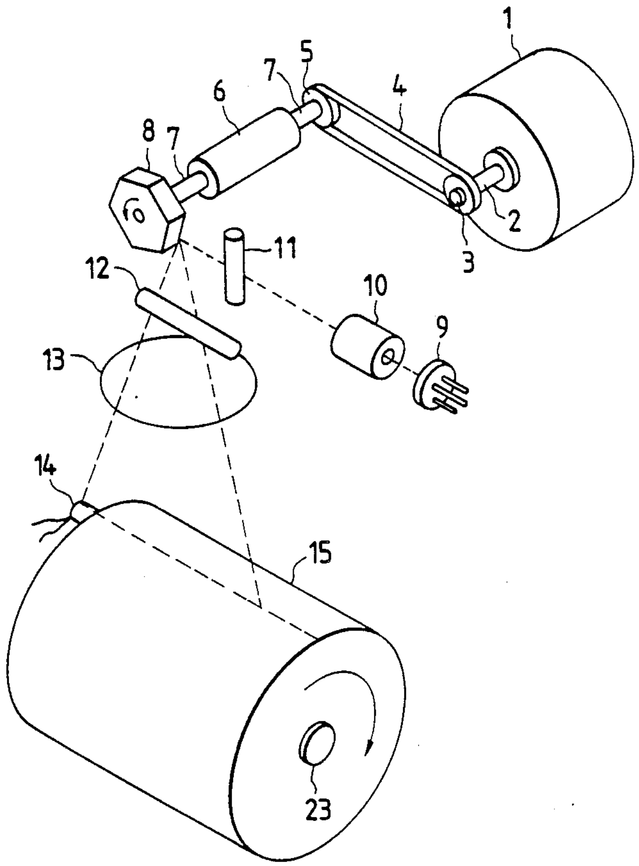
FIG. 1 is a perspective view partially showing an electrophotography system according to an embodiment of the present invention.

Referring now to FIGS. 1 and 2, there is schematically illustrated a multi-function electrophotography system according to an embodiment of the present invention which is applicable to all of laser beam printer which forms an electrostatic image by a laser beam controllable in intensity in accordance with an information signal, copying machine which forms an electrostatic image by optical illumination of an original picture and printing machine which forms an electrostatic-image master for allowing repeatable use. In FIGS. 1 and 2, the electrophotography system includes an optical system basically comprising a rotatable mirror wheel 8 which has on its circumference a plurality of mirrors so as to form a polygon mirror device and a semiconductor laser 9 for emitting a laser beam whose intensity is controllable in accordance with a control signal fed from a laser control unit, not shown. The rotatable mirror wheel 8 is arranged to be rotatable in response to operation of a drive motor 1. That is, the rotatable mirror wheel 8 has at its center portion a rotating shaft 7 which is in turn coupled through a pulley 5, a belt 4 and another pulley 3 to a drive shaft 2 of the drive motor 1, the belt 4 being stretched between the pulleys 3 and 4. Numeral 6 represents a bearing for supporting the rotating shaft 7 of the rotatable mirror wheel 8.

A laser beam emitted from the semiconductor laser 9 passes through a collimator lens 10 and a cylindrical lens 1 and then reaches a mirror surface formed on the circumference of the rotatable mirror wheel 8. In accordance with rotation of the rotatable mirror wheel 8, the laser beam is successively reflected by the mirror surfaces thereof, whereby the reflected laser beam is successively deflected in a predetermined plane including the optical axis of the laser beam directing from the semiconductor laser 9 toward the rotatable mirror wheel 8. The reflected laser beam reaches the circumference of a photosensitive drum 15 after passed through a toroidal lens 12 and a doublet spherical lens 13, so that the circumference of the photosensitive drum 15 is scanned by the reflected laser beam along a geometric generator of the photosensitive drum 15 so as to effect the principal scanning. The photosensitive drum 15 is rotatable about the axis of the rotating shaft 33 by means of a drive mechanism, not shown, thereby allowing the secondary scanning. A portion of the laser beam reflected by the rotatable mirror wheel 8 is incident on a photodetector 14, the output of which is used for controlling the phase of the principal scanning due to the reflected laser beam.

Figure 2A:
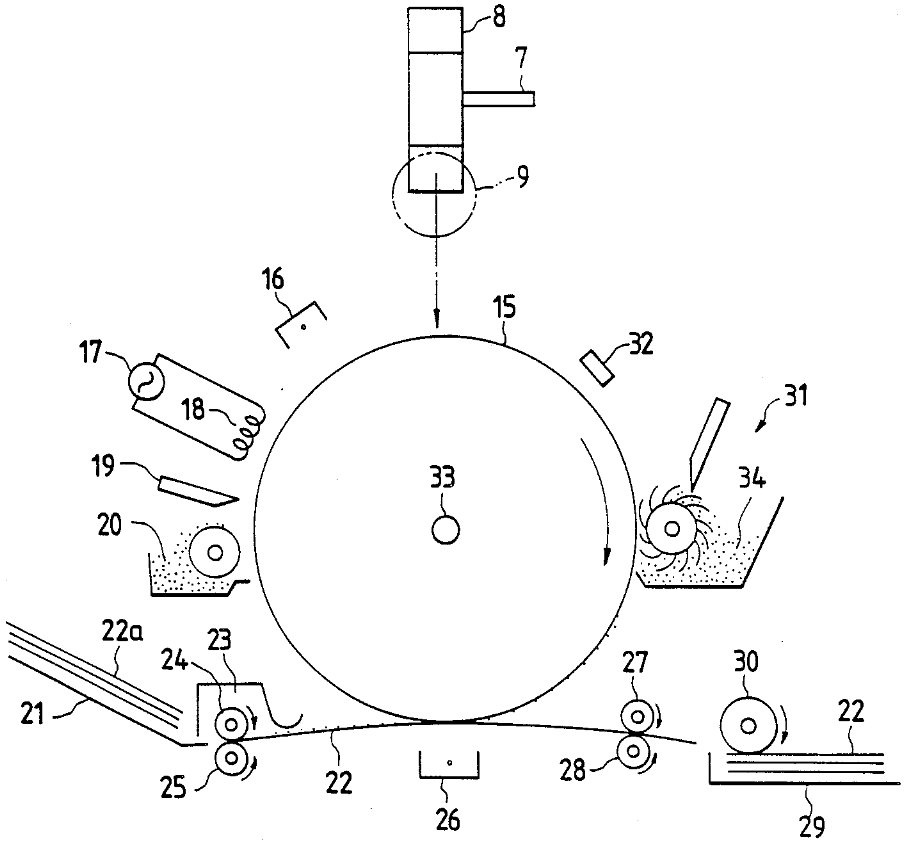
FIG. 2A is a side view of the FIG. 1 electrophotography system.

Moreover, as illustrated in FIG. 2A, around the photosensitive drum 15 are disposed an electrifier 16 for electrically charging the photosensitive drum 15, a heater 18 powered by a power source 17, and a developing device 31 having therein a toner 34 for developing, with the toner, an electrostatic latent image formed on the circumferential surface of the photosensitive drum 15. In a transferring section comprising an electrifier 26 and rollers 27, 28, the toner image formed on the photosensitive drum 15 is transferred onto transfer paper 22 fed from a paper feeding section comprising a paper-storing tray 29 and a paper-feeding roller 30. The toner image transferred on the transfer paper 22 is fixed in a fixing section 23 including fixing rollers 24 and 25, before the transfer paper 22 is discharged into a receiving tray 21 which stores the hard copies *22a*. Further disposed in the vicinity of the photosensitive drum 15 are a light source 32 which will be described hereinafter, a cleaning device comprising a cleaning blade 19 and a toner-collection box 20 to remove the toner remaining on the circumferential surface of the photosensitive drum 15.

Figure 2B:
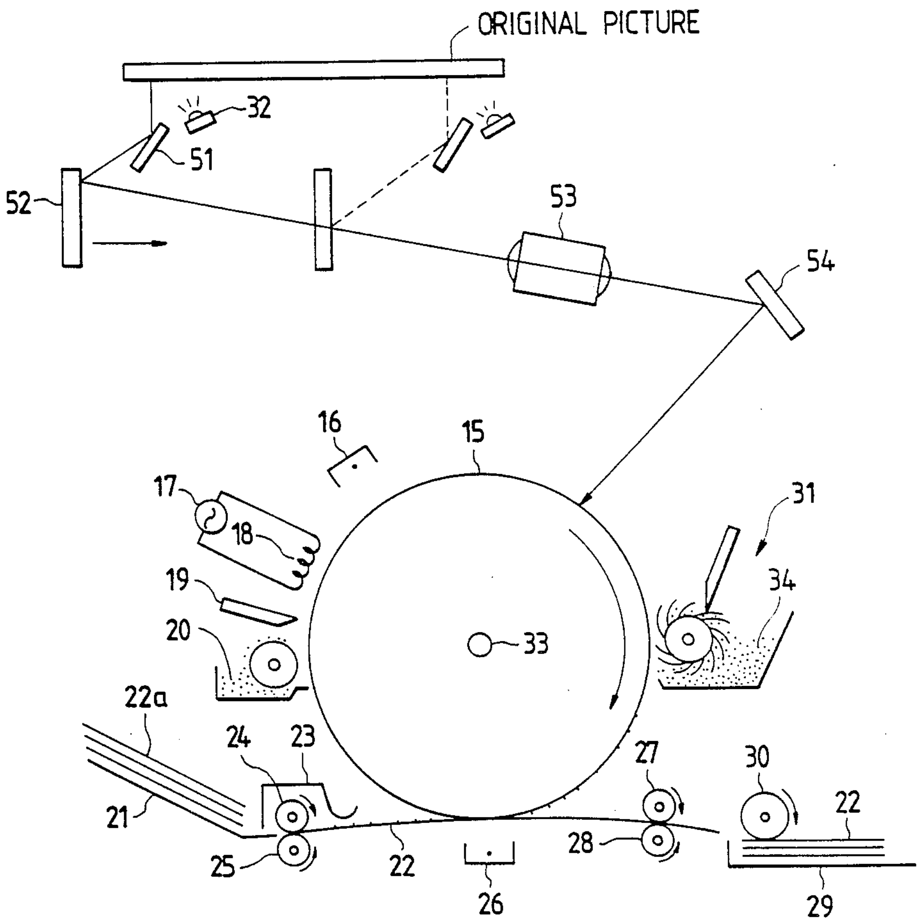
FIG. 2B is a side view principally showing an optical system for illuminating an original picture.

FIG. 2B shows an optical system to be used in a copying machine to expose the optical image of an original picture with respect to the photosensitive drum 15. The illustrated optical system is of the original-fixing and light-moving type and arranged so as to scan the original picture by means of the light source 32, the reflected light including the optical image of the original picture is introduced through mirrors 51, 52, a lens 53 and a mirror 54 into the photosensitive drum 15.

The operations of the photosensitive drum 15 and the optical systems illustrated in FIGS. 1 to 2B are made under control of a control unit comprising, for example, a well known microcomputer including a central processing unit and others.

Figure 3:
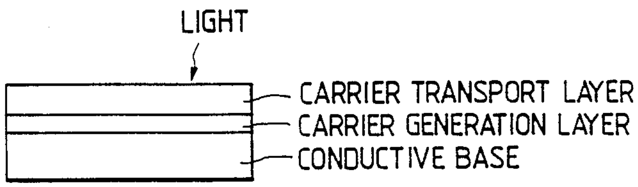
FIG. 3 is an illustration for describing an arrangement of a photosensitive member provided on the circumferential surface of a photosensitive drum of the Fig. 1 electrophotography system.
Figure 4:
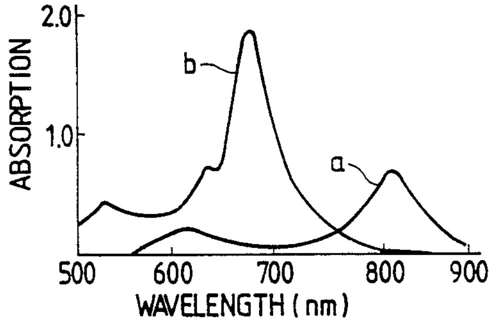
FIG. 4 is a graphic diagram showing a first absorption spectrum and a second absorption spectrum which are taken in the photosensitive member.

On the circumferential surface of the photosensitive drum 15 is provided a photosensitive member made of a carrier generation material and a carrier transport material, preferably comprising a carrier generation layer (CGL) made of the carrier generation material and a carrier transport layer (CTL) made of the carrier transport material which are placed one upon another to form a two-layer photosensitive member which has a higher sensitivity as compared with that of a single-layer photosensitive member. As illustrated in FIG. 3, the photosensitive member is constructed such that the carrier generation layer is mounted on a conductive base made of an aluminium (for example), and the carrier transport layer is further mounted on the carrier generation layer. One feature of the photosensitive member is to show absorption spectrum states as illustrated in FIG. 4 where character a represents a curve showing a first absorption spectrum and character b designates a curve showing a second absorption spectrum. More specifically, as the carrier generation layer (CGL) is used an organic photosensitive layer having a photo-electric conversion function and a carrier generation function to produce a charge carrier in response to absorption of light, and further permitting shifting of the spectrum in accordance with variation of aggregation and orientation caused by illumination of a light beam, i.e., allowing variation from the first absorption spectrum (a in FIG. 4) to the second absorption spectrum (b in FIG. 4) due to incidence of a light beam which has an intensity exceeding a a specific value (i.e., a threshold) so that a portion of the photosensitive member is illuminated with a quantity of light exceeding a threshold, and which has a wavelength is in a predetermined wavelength region. In FIG. 4, the absorption peak in the first absorption spectrum a is positioned at the long-wavelength side as compared with the absorption peak in the second absorption spectrum b.

As one example of such a material is known a cyanine dye having the following general formula:

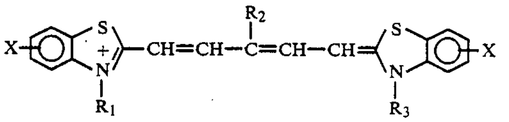

where $R_1$, $R_3$ represent alkyl group, alkylamine, alkylsulfone group, R2 designates alkyl group, phenyl group, and X depicts Cl, Br.

Instead of the aforementioned cyanine dye, it is also appropriate to use, as such a material, aluminium phthalocyanine chloride, vanadyl phthalocyanine and others.

On the other hand, the carrier transport layer is formed by means of the deposition, application or Langmuir-Blodgett technique. Further, as the carrier transport material having a carrier transport function to allow transport of the carrier produced in the carrier generation material, there are an electron acceptor such as trinitrofluorenone, and an electron donor such as a polymer with a side chain of heterocyclic compound such as poly-N-vinylarbozole, a triazole derivative, an oxadiazole derivative, an imidazole derivative, a pyrazoline derivative, a polyaraylalkane, derivative, a phenylene diamine derivative, a hydrazone derivative, a phenylene diamine derivative, a hydrazone derivative, an amino permutation chalcone derivative, a triarylamine derivative, a carbazole derivative, a stilbene derivative.

Here, in the case of using a binding agent for the carrier generation layer or carrier transport layer, as the binding agent are used one or more selected from polycarbonate, polyester, methacrylic resin, acrylic resin, polyvinyl chloride, polyvinylidene chloride, polystyrene, polyvinyl acetate, styrene-butadiene copolymer, vinylidene chloride-acrylonitrile copolymer, vinyl chloride-vinyl acetate copolymer, vinyl chloride-vinyl acetate-maleic anhydride copolymer, silicone resin, butyral resin, poly-N-vinylcarbazole and other.

A description will be made hereinbelow in terms of formation of an electrostatic latent image on the photosensitive member of the photosensitive drum 15. The formation of an electrostatic latent image on the above-mentioned photosensitive member of the photosensitive drum 15 is effected in accordance with the following image-forming modes.

First Image-Forming Mode

After initialization of the photosensitive member of the photosensitive drum 15 to cause the carrier generation layer to take the first spectrum state (a in FIG. 4), the photosensitive member is evenly charged by the electrifier 16 and a light beam emitted from the semiconductor laser 9 and intensity-modulated in accordance with an information signal is then projected through the optically scanning mechanism, comprising the rotatable mirror wheel 8 and others, onto the photosensitive member of the photosensitive drum 15 so as to form the thereon an electrostatic latent image corresponding to the information signal with the photosensitive member taking the first spectrum state. The light beam has an intensity below the threshold and has a wavelength in a first wavelength region (about 750 to 850 nm) which substantially corresponds to the neighborhood wavelength region of the absorption peak in the first absorption spectrum (a in FIG. 4). Here, the wavelength of a laser beam is in the first wavelength region. The formed electrostatic latent image is developed with a toner by means of the developing device 31 and transferred to transfer paper by the electrifier 26 and the toner image transferred to the transfer paper is fixed in the fixing section 23 so as to obtain a hard copy 22*a*. This first image-forming mode can be employed for a laser printer. Here, the initialization can be effected such that the circumferential surface of the photosensitive member is heated up to a predetermined temperature by the heater 18 and then cooled slowly, or exposed to vapor or an atmosphere of ethanol. It is also appropriate to use, instead of the semiconductor laser 9, a light-emitting diode array, an electroluminescence element array or others as the light source for emitting light whose wavelength is in the first wavelength region.

Second Image-Forming Mode

After the same initialization of the photosensitive member thereof to cause the carrier generation layer to take the first spectrum state (a in FIG. 4), a light beam, whose intensity is above the threshold and whose wavelength is in the first wavelength region, emitted from the semiconductor laser 9 and intensity-modulated in accordance with an information signal is then projected through the optically scanning mechanism onto the photosensitive member so that the photosensitive member partially takes the second spectrum state (b in FIG. 4) in correspondence with the information signal, that is, the exposed portion (written portion) is in the second spectrum state and the non-exposed portion (non-written portion) is in the first spectrum state. Thereafter, the photosensitive member is evenly charged by the electrifier 16 and a light (exposing light) in a second wavelength region (about 600 to 700 nm) is projected onto the whole circumferential surface of the photosensitive member. As a result, the resistivity of only the written portion is lowered when the exposing light is projected, and an electrostatic latent image corresponding to the information signal is formed. The second wavelength region substantially corresponds to the neighborhood wavelength region of the absorption peak in the second absorption spectrum b. The projection of the exposing light may be performed by the light source 32 such as a light-emitting diode array and a lamp array. The formed electrostatic latent image can be used as a master for printing because it is not erased until the photosensitive member is processed for the above-described initialization, and hence this second image-forming mode can be employed for a printing machine. Here, for increasing the intensity of the laser beam, there are methods: increasing the current supplied to the semiconductor laser 9, decreasing the scanning speed with respect to the photosensitive member, and scanning several times the same scanning line. Further, the projection of the whole surface of the photosensitive member can be achieved by the principal scanning due to the rotatable mirror wheel 8 and the secondary scanning caused by the rotation of the photosensitive drum 15.

Third Image-Forming Mode

After the same initialization of the photosensitive member thereof to cause the carrier generation layer to take the first spectrum state (a in FIG. 4), the photosensitive member is evenly charged and light including optical information is then projected onto the photosensitive member so as to form thereon an electrostatic latent image corresponding to the optical information with the photosensitive member taking the first spectrum state. The light beam has an intensity below the threshold and has wavelength in the first wavelength region. This image-forming mode can be employed for a copying machine. In this case, an original picture which may be placed on an original-mounting base of the copying machine is scanned by an adequate light source (32) and the reflected light indicative of the optical information of the original picture is introduced into the photosensitive member of the photosensitive drum 15. The formed electrostatic latent image is developed with a toner by means of the developing device 31 and transferred to transfer paper by the electrifier 26 and the toner image transferred to the transfer paper is fixed in the fixing section 23 so as to obtain a hard copy *22a*

Fourth Image-Forming Mode

AFter the same initialization of the photosensitive member thereof to cause the carrier generation layer to take the first spectrum state (a in FIG. 4), the photosensitive member is illuminated with a light beam whose intensity is above the threshold and whose wavelength is in the first wavelength region so that the whole surface of the photosensitive member takes the second spectrum state (b in FIG. 4). The second spectrum state can also be effected by heating and rapid cooling of the photosensitive member. The photosensitive member with the second spectrum state is evenly charged, and a light beam which has an wavelength in the second wavelength region and which is intensity-modulated in accordance with optical information is projected onto the photosensitive member so as to form thereon an electrostatic latent image corresponding to the optical information. Similarly, this image-forming mode can be employed for a copying machine. Thus, the light beam is a reflected light beam produced by scanning of an original picture effected by a light source (32) for emitting light which is in the second wavelength region. In this case, since the photosensitive member takes the second spectrum state at the time of the formation of the electrostatic latent image, the above-described initialization process may be required to return it to the first spectrum state for the next recording.

Figure 5:
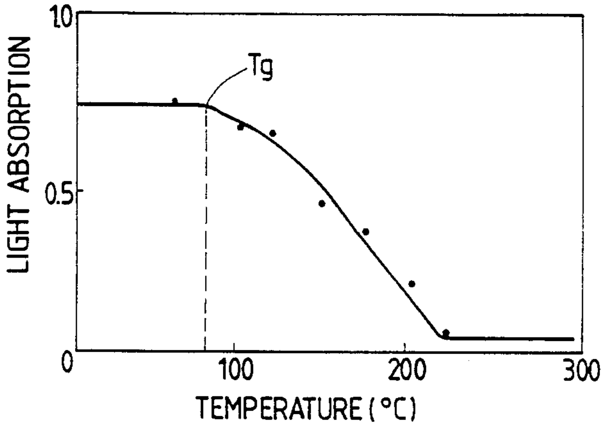
FIG. 5 is a graphic diagram showing variation of light absorption with respect to variation of temperature.
Figure 6:
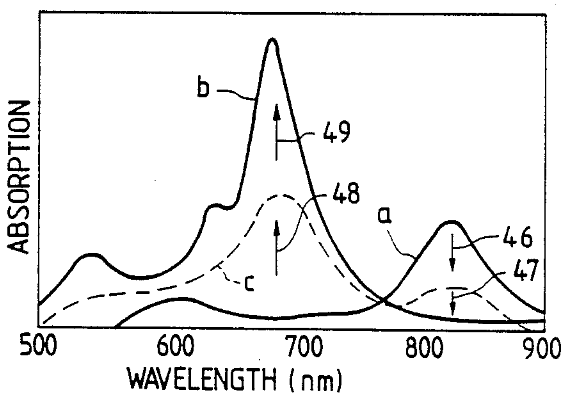
FIG. 6 is a graphic diagram showing variations of the first and second absorption spectrum states.

The variation of the photosensitive member from the first absorption spectrum state to the second absorption spectrum state is made with the photosensitive member being heated to become above a glass transition temperature Tg (FIG. 5) due to illumination of light whose intensity is over the threshold and whose wavelength is in the first wavelength region. In FIG. 5, the axis of abscissa represents a temperature up to which the photosensitive member is heated and then rapidly cooled, and the axis of ordinate represents the degree of the absorption of incident light having a wavelength in the first wavelength region in the photosensitive member thus processed (i.e., heated and rapidly cooled). FIG. 5 shows that the absorption of the incident light starts decreasing at a heated temperature of about 100° C. and becomes substantially zero at a heated temperature of about 240° C. The absorption spectrum is successively varied from the state indicated by a solid line a in FIG. 6 through the states indicated by dotted line c to the state indicated by b in the same figure. In FIG. 6, arrows 46 to 49 represent the varying directions caused by the raise in the heated temperature of the photosensitive member. Thus, since the variation from the first spectrum state to the second spectrum state successively occurs in response to variation of the heated temperature in a specific range above the glass transition temperature, when a light beam which has an intensity above the threshold and which has a wavelength in the first wavelength region is incident on the photosensitive member the carrier generation layer of which is first arranged to take the first spectrum state, an intermediate state between the first and second spectrum states is taken on the photosensitive member. In this state, the photosensitive member can have thereon an electrostatic latent image corresponding to the information signal in response to illumination of a light beam which has a wavelength in the wavelength region (first wavelength region) corresponding to the neighborhood of the peak of the second absorption spectrum after evenly charging the photosensitive member by the electrifier 16.

Figure 7:
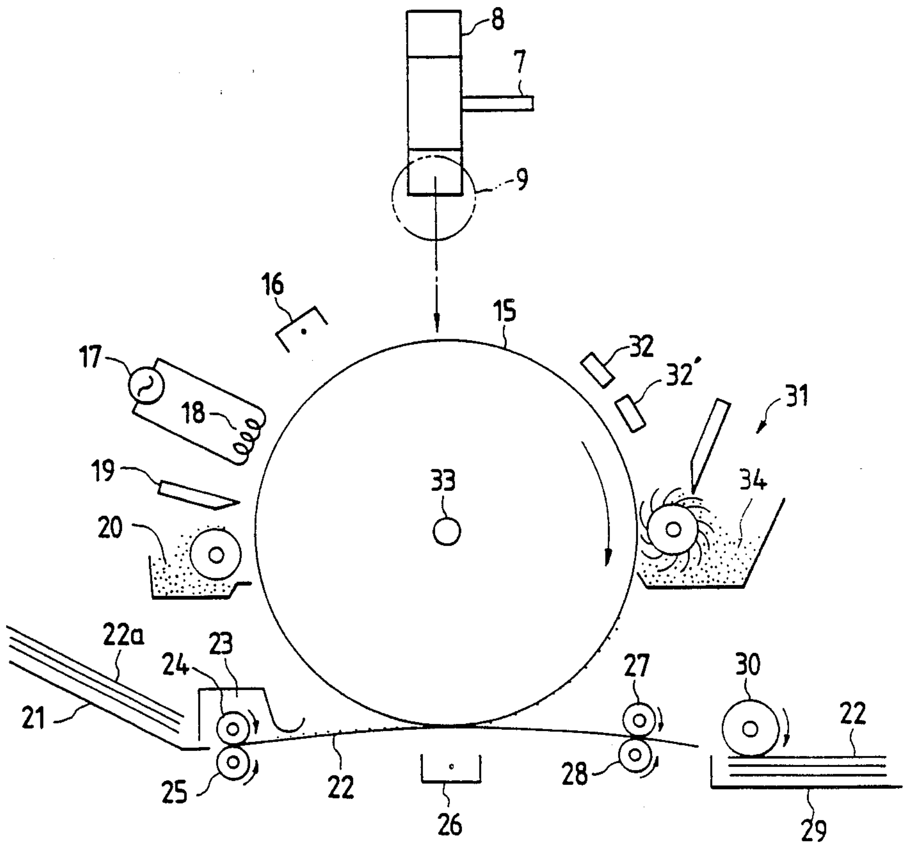
FIG. 7 is an illustration for describing a second embodiment of the electrophotography system according to this invention.

A second embodiment of the present invention will be described hereinbelow with reference to FIG. 7 in which parts corresponding to those in FIG. 2A are marked with the same reference numerals and the description thereof will be omitted for brevity. An electrophotography system of the second embodiment similarly includes a photosensitive drum 15 having on its circumferential surface a photosensitive member comprising the carrier generation layer and the carrier transport layer as described in the first embodiment. One difference of the second embodiment with respect to the first embodiment is that the electrophotography system further has a light source 32' such as a light-emitting diode array and a lamp array for emitting a light beam whose wavelength is in the first wavelength region corresponding to the neighborhood wavelength region of the peak of the first spectrum indicated by a in FIG. 4, and is arranged so as to take the following five image-forming modes for forming an electrostatic latent image on the photosensitive member of the photosensitive drum 15.

First Image-Forming Mode

After initialization of the photosensitive member of the photosensitive drum 15 to cause the carrier generation layer to take the first spectrum state (a in FIG. 4), the photosensitive member is evenly charged by the electrifier 16 and a light beam emitted from the semiconductor laser 9 and intensity-modulated in accordance with an information signal is then projected through the optically scanning mechanism, comprising the rotatable mirror wheel 8 and others, onto the photosensitive member of the photosensitive drum 15 so as to form thereon an electrostatic latent image corresponding to the information signal with the photosensitive member taking the first spectrum state. The light beam has an intensity below the threshold and has a wavelength in the first wavelength region. The formed electrostatic latent image is developed with a toner by means of the developing device 31 and transferred to transfer paper by the electrifier 26 and the toner image transferred to the transfer paper is fixed in the fixing section 23 so as to obtain a hard copy 22*a*. As well as the first image-forming mode in the first embodiment, this first image-forming mode can be employed for a laser printer, and the initialization can be effected such that the circumferential surface of the photosensitive member is heated up to a predetermined temperature by the heater 18 and then cooled slowly, or exposed to vapor or an atmosphere of ethanol.

Second Image-Forming Mode

After the same initialization of the photosensitive member thereof to cause the carrier generation layer to take the first spectrum state (a in FIG. 4), a light beam, whose intensity is above the threshold in the first wavelength region, emitted from the semiconductor laser 9 and intensity-modulated in accordance with an information signal is then projected through the optically scanning mechanism onto the photosensitive member so that the photosensitive member partially takes the second spectrum state (b in FIG. 4) in correspondence with the information signal, that is, the exposed portion (written portion) is in the second spectrum state and the non-exposed portion (non-written portion) is in the first spectrum state. Thereafter, the photosensitive member is evenly charged by the electrifier 16 and a light beam (exposing light) in the second wavelength region is projected onto the whole circumferential surface of the photosensitive member. As a result, the resistivity of only the written portion is lowered when the exposing light is projected, and an electrostatic latent image corresponding to the information signal is formed. The projection of the exposing light may be performed by the light source 32 such as a light-emitting diode array and a lamp array. Similarly, the formed electrostatic latent image can be used as a master for printing, and hence this second image-forming mode can be employed for a printing machine.

Third Image-Forming Mode

After the same initialization of the photosensitive member thereof to cause the carrier generation layer to take the first spectrum state (a in FIG. 4), projection of a light beam whose intensity is above the threshold and whose wavelength is in the first wavelength region and which is emitted from the semiconductor laser 9 with the intensity being modulated in accordance with an information signal is effected to the photosensitive member so that the photosensitive member partially takes the second spectrum state (b in FIG. 4) in correspondence with the information signal, that is, the exposed portion (written portion) is in the second spectrum state and the non-exposed portion (non-written portion) is in the first spectrum state. Thereafter, the photosensitive member is evenly charged by the electrifier 16 and a light beam (exposing light) in the first wavelength region is projected onto the whole circumferential surface of the photosensitive member so as to form an electrostatic latent image corresponding to the information signal. The exposing light is arranged to be emitted from the light source 32' illustrated in FIG. 7. Here, it is also appropriate to use a laser beam as the exposing light, because the wavelength of the laser beam can be included in the region corresponding to the neighborhood of the peak of the first absorption spectrum. The third image-forming mode can be employed for a printing machine. That is, the portion of the photosensitive member which takes the second spectrum state is not erased until the initialization process is effected therefor.

Fourth Image-forming Mode

After the same initialization of the photosensitive member thereof to cause the carrier generation layer to take the first spectrum state (a in FIG. 4), the photosensitive member is evenly charged and a light beam including optical information is then projected onto the photosensitive member so as to form thereon an electrostatic latent image corresponding to the optical information with the photosensitive member taking the first spectrum state. The light beam has an intensity below the threshold and has wavelength in the first wavelength region. This image-forming mode can be employed for a copying machine. In this case, an original picture which may be placed on an original-mounting base of the copying machine is scanned by a light source (32) and the reflected light beam indicative of the optical information of the original picture is arranged to be introduced into the photosensitive member of the photosensitive drum 15. The formed electrostatic latent image is developed with a toner by means of the developing device 31 and transferred to transfer paper by the electrifier 26 and the toner image transferred to the transfer paper is fixed in the fixing section 23 so as to obtain a hard copy 22*a*.

Fifth Image-Forming Mode

After the same initialization of the photosensitive member thereof to cause the carrier generation layer to take the first spectrum state (a in FIG. 4), the photosensitive member is illuminated with a light beam whose intensity is above the threshold and whose wavelength is in the first wavelength region so that the whole surface of the photosensitive member takes the second spectrum state (b in FIG. 4). The second spectrum state can also be effected by heating and rapid cooling of the photosensitive member. The photosensitive member with the second spectrum state is evenly charged and a light beam whose wavelength is in the second wavelength region and which is intensity-modulated in accordance with optical information is projected onto the photosensitive member so as to form thereon an electrostatic latent image corresponding to the optical information. Similarly, this image-forming mode can be employed for a copying machine. The light beam is a reflected light beam produced by scanning of an original picture effected by a light source (32) for emitting light whose wavelength is in the second wavelength region.

Figure 8:
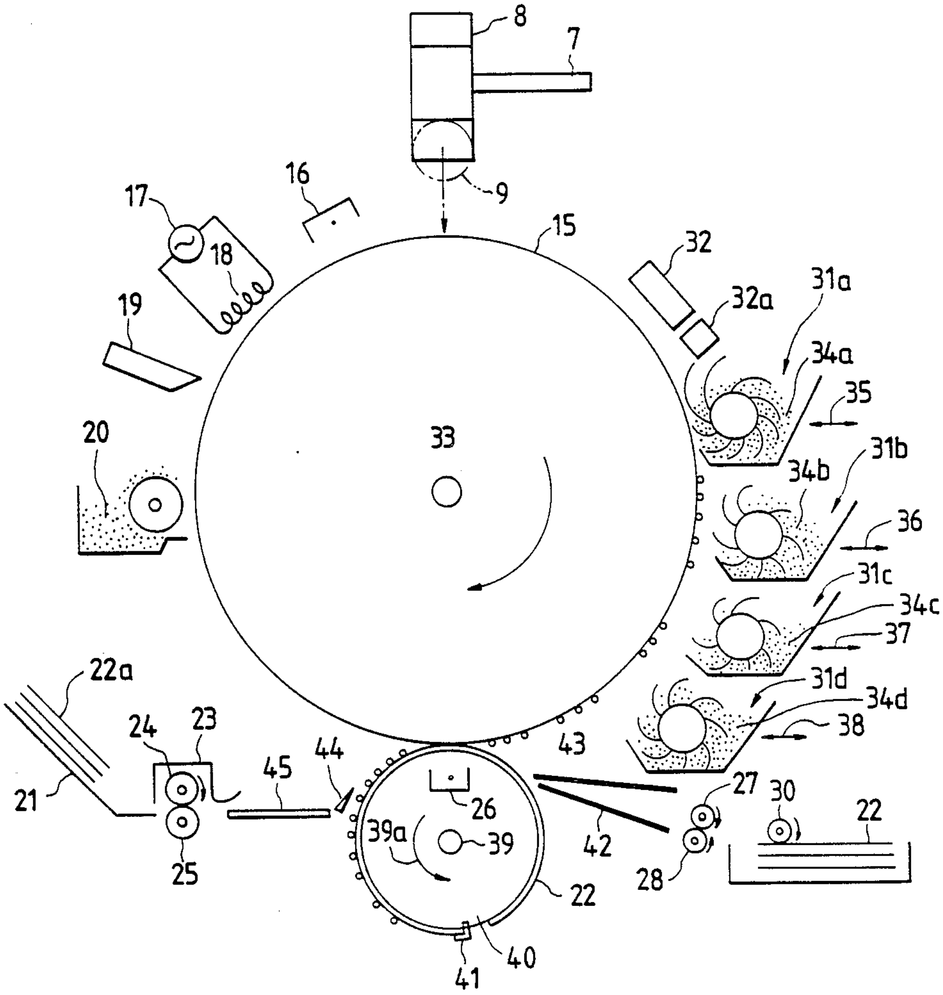
FIG. 8 is an illustration for describing a third embodiment of the electrophotography system according to this invention.

A description of a third embodiment of this invention will be made hereinbelow with reference to FIG. 8. FIG. 8 illustrates an arrangement of an electrophotography system according of the third embodiment which similarly includes a photosensitive drum 15 having on its circumferential surface a photosensitive member comprising the carrier generation layer and the carrier transport layer as described above with reference to FIG. 2A. Parts corresponding to those in FIG. 2A are marked with the same numerals and the description thereof will be omitted for brevity. In FIG. 8, one difference between the electrophotography system of FIG. 2A and the electrophotography system of FIG. 8 is that there are four developing devices 31*a* to 31*d* equipped with different-color toners 34*a* to 34*d* and arranged to be movable along arrows 35 to 38 for closing and separating to and from the photosensitive drum 15. That is, the FIG. 8 electrophotography system acts as a multi-color electrophotography system for obtaining a multi-color image by selective operations of the four developing devices 31*a* to 31*d* effected in accordance with control signals corresponding to multi-color image signals, i.e., a yellow color signal, a magenta color signal, a cyanogen color signal, and a black and white color signal, from an image processing circuit, not shown. The electrophotography system further includes a transferring drum 40 arranged to be rotatable in the direction of an arrow 39*a* in accordance with rotation of a rotating shaft 39. When being fed through guide plates 42, 43 to the transferring drum 40 by means of operations of rollers 30, and 27, 28, transferring paper 22 is clamped by a clamper 41 provided at the circumferential surface of the transferring drum 40, so as to be wrapped around the circumferential surface of the transferring drum 40 in accordance with rotation of the transferring drum 40. The transferring paper 22 wrapped around the transferring drum 40 is rotated in correspondence with the number of the developing devices so as to form one multi-color toner image, and then carried through guide plates 44, 45 toward a fixing section 23.

A description will be made hereinbelow in terms of the case that the electrophotography system of FIG. 8 is employed for a multi-color printing machine. After the initialization process to cause the carrier generation layer of the image forming area of the photosensitive member to take the first spectrum state, a laser beam from a semiconductor laser 9 which is intensity-modulated in accordance with an information signal for each color signal is projected onto the image forming area of the photosensitive member so as to attain thereon portions of the second spectrum state in correspondence with the information signal. The laser beam to be projected thereon has an intensity above the threshold and has a wavelength in the first wavelength region. The second spectrum portions on the photosensitive member of the photosensitive drum 15 is kept till execution of the above-mentioned initialization process, thereby acting as a master, i.e., a printing plate, for the printing. Thereafter, an electrifier 16 is operated so as to evenly charge the photosensitive member, and a light source such as a light-emitting diode array 32 is powered to illuminate the photosensitive member with light whose wavelength is in the region corresponding to the neighborhood of the peak of the second absorption spectrum as illustrated in FIG. 4. This mode corresponds to the second image-forming mode of the first embodiment. This causes, at the image forming area, formation of electrostatic images corresponding to the respective color images, each electrostatic image being developed with the corresponding developing device to form different toner images which are in turn transferred to the transferring paper 20 by means of the transferring drum 40. Here, in the case that a plurality of electrostatic images are successively formed in the image forming area of the photosensitive member, the developing timings for the respective electrostatic images are different from each other, and hence the attenuation amounts of the surface charge of the respective electrostatic images result in being different from each other. This can cause deterioration of the quality of the printed picture. For eliminating this problem, the electrophotography system further includes an auxiliary 32*a* which additionally illuminates the image forming area in accordance with an illumination control signal so that the attenuation amounts become equal to each other. It is also appropriate to optically or electrically switch the intensity of the laser light from the semiconductor laser 9.

Furthermore, after the whole circumferential surface of the photosensitive member is processed so as to take the second spectrum state by scanning the photosensitive member with light whose intensity is above the threshold and whose wavelength is in the first wavelength region or by heating and rapidly cooling the photosensitive member, the photosensitive member is evenly charged by the electrifier 16 and then illuminated with a reflected light beam from an original picture due to the light source 32 thereby obtaining thereon an electrostatic latent image. The reflected light beam has a wavelength which is in the region including the second absorption spectrum and is intensity-modulated in correspondence with the optical image of the original picture. This mode corresponds to the fourth image-forming mode of the first embodiment. This electrophotography system can effect the first and third image-forming modes of the first embodiment, so as to be employed for a laser printer and a copying machine.

It should be understood that the foregoing relates to only preferred embodiments of the present invention, and that it is intended to cover all changes and modifications of the embodiments of the invention herein used for the purposes of the disclosure, which do not consititute departures from the spirit and scope of the invention.

What is claimed is:

1. An electrophotography system comprising:

a rotatable drum arranged to be rotatable about its own axis in accordance with a drum-drive signal and having on its circumferential surface a photosensitive member for holding an electrostatic latent image, said photosensitive member being arranged to take a first absorption spectrum state and a second absorption spectrum state, and the variation from said first absorption spectrum state to said second absorption spectrum state being made by illuminating said photosensitive member with light whose intensity is above a predetermined threshold and whose wavelength is in a first predetermined wavelength region;

an optical system including light source means for illumination of said photosensitive member so as to form an electrostatic latent image on said photosensitive member, said optical system being arranged to directly illuminate said photosensitive member by light from said light source means and further to illuminate said photosensitive member by reflected light from an original picture due to said light source means, said light source means being arranged to emit light whose wavelength is in said first predetermined wavelength region and further emit light whose wavelength is in a second predetermined wavelength region, the intensity of the light emitted from said light source means being controllable in intensity in accordance with an information signal;

electrifier means for charging said photosensitive member in response to an electrifier-drive signal; and control means for generating said drum-drive signal, said information signal and said electrifier-drive signal to control the rotation of said rotatable drum, said optical system and said electrifier means so as to form an electrostatic latent image on said photosensitive member by selectively performing a laser-printing mode, a printing mode, a first copying mode and a second copying mode, said laser printing mode being effected by evenly charging said photosensitive member, taking said first absorption spectrum state, by means of said electrifier means before illuminating said photosensitive member with light from said light source means whose intensity is below said predetermined threshold and whose wavelength is in said first predetermined wavelength region, said printing mode being effected by illuminating said photosensitive member, taking said first absorption spectrum state, with light from said light source means, whose intensity is above said predetermined threshold and whose wavelength is in said first predetermined wavelength region, so that said photosensitive member partially takes said second absorption spectrum state in correspondence with said information signal and evenly charging said photosensitive member by said electrifier means before illuminating the whole surface of said photosensitive member with light which has a wavelength in said second predetermined wavelength region, said first copying mode being effected by charging said photosensitive member, taking said first absorption spectrum state, by means of said electrifier means and then illuminating said photosensitive member with reflected light from the original picture which has an intensity below said predetermined threshold and which has a wavelength in said first predetermined wavelength region, and second copying mode being effected by illuminating said photosensitive member with light from said light source means, whose intensity is above said predetermined threshold and whose wavelength is in said first predetermined wavelength region, so that said photosensitive member wholly takes said second absorption spectrum state and then charging said photosensitive member by said electrifier means before illuminating said photosensitive member with reflected light from the original picture which has an wavelength in said second predetermined wavelength region.

2. An electrophotography system as claimed in claim 1, wherein said control means is arranged to further perform a second printing mode in which said photosensitive member, taking said first absorption spectrum state, is illuminated with light from said light source means, whose intensity is above said predetermined threshold and whose wavelength is in said first predetermined wavelength region, so that said photosensitive member partially takes said second absorption spectrum state in correspondence with said information signal and evenly charged by said electrifier means before illuminating the whole surface of said photosensitive member with light which has an wavelength in said first predetermined wavelength region.

3. An electrophotography system as claimed in claim 1, wherein said photosensitive member comprises a carrier generation layer made of a carrier generation material which allows production of a charge carrier in response to absorption of light and a carrier transport layer made of a carrier transport material which allows transport of the charge carrier produced in said carrier generation material, said carrier transport layer is mounted on said carrier generation layer to construct said photosensitive member.

4. An electrophotography system as claimed in claim 1, wherein said light source means includes a semiconductor laser which emits the light whose wavelength is in said first predetermined wavelength region and further includes a light-emitting diode array which emits the light whose wavelength is in said second predetermined wavelength region.

5. An electrophotography system as claimed in claim 1, further comprising a plurality of different-color developing means provided around said rotatable drum to form a multi-color toner image, and wherein said control means forms a plurality of electrostatic latent images on a predetermined area of said photosensitive member in accordance with different color signals supplied from the external, said plurality of electrostatic latent images being developed by said plurality of developing means to form said multi-color toner image.

6. An electrophotography system as claimed in claim 1, wherein said first predetermined wavelength region substantially corresponds to a wavelength region in the neighborhood of a peak of said first absorption spectrum and said second predetermined wavelength region substantially corresponds to a wavelength region in the neighborhood of a peak of said second absorption spectrum, the peak of said first absorption spectrum being positioned at the long-wavelength side as compared with the peak of said second absorption spectrum.

7. An electrophotography system as claimed in claim 1, further comprising heater means provided in the vicinity of said photosensitive member for heating said photosensitive member, and wherein said control means controls said heater means after completion of each of the respective electrostatic-image forming modes so as to heat said photosensitive member up to a predetermined temperature and then cool it slowly, whereby said photosensitive member is changed from said second absorption spectrum state to said first absorption spectrum state.

8. An electrophotography system as claimed in claim 1, wherein said photosensitive member is successively changed from said first absorption spectrum state to said second absorption spectrum state in response to successive change of the intensity of light whose intensity is above said threshold and whose wavelength is in said first predetermined wavelength region, and said control means operates said optical system to illuminate said photosensitive member with light, whose intensity is above said threshold and whose wavelength is in said first predetermined wavelength region, so that said photosensitive member takes an intermediate state between said first and second absorption spectrum states in correspondence with the information signal and controls said electrifier means to evenly charge said photosensitive member before controlling said optical system to illuminate it with light whose wavelength is in said second wavelength region.

* * * * *